United States Patent
Nam et al.

(10) Patent No.: US 11,653,249 B2
(45) Date of Patent: *May 16, 2023

(54) DISAMBIGUATION OF RANDOM ACCESS RESPONSE FOR RANDOM ACCESS SUPPORT ON SUPPLEMENTAL UPLINK

(71) Applicant: QUALCOMM Incorporated, San Diego, CA (US)

(72) Inventors: Wooseok Nam, San Diego, CA (US); Tao Luo, San Diego, CA (US); Peter Gaal, San Diego, CA (US); Heechoon Lee, San Diego, CA (US); Peter Pui Lok Ang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,119

(22) Filed: Nov. 13, 2020

(65) Prior Publication Data

US 2021/0099906 A1 Apr. 1, 2021

Related U.S. Application Data

(63) Continuation of application No. 16/168,282, filed on Oct. 23, 2018, now Pat. No. 10,841,828.
(Continued)

(51) Int. Cl.
*H04W 28/02* (2009.01)
*H04W 74/08* (2009.01)
(Continued)

(52) U.S. Cl.
CPC ......... *H04W 28/0263* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

| 2010/0002590 A1* | 1/2010 | Park | H04W 74/006 |
| | | | 370/241 |
| 2011/0045837 A1* | 2/2011 | Kim | H04W 74/0833 |
| | | | 455/452.1 |

(Continued)

FOREIGN PATENT DOCUMENTS

| CN | 102668440 A | 9/2012 |
| CN | 105409135 A | 3/2016 |

(Continued)

OTHER PUBLICATIONS

Huawei, et al: "Remaining Issues in RACH Procedure," 3GPP Draft; R1-1717051, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340242, 11 pages, Retrieved from the Internet: URL: http://www.3gpp.org/ftp/Meetings_3GPP_SYNC/RAN1/Docs/ [retrieved on Oct. 8, 2017], Section 1, p. 1.

(Continued)

*Primary Examiner* — Alpus Hsu
*Assistant Examiner* — Camquyen Thai
(74) *Attorney, Agent, or Firm* — QUALCOMM Incorporated

(57) ABSTRACT

Certain aspects of the present disclosure relate to communication systems, and more particularly, to random access channel (RACH) procedures in deployments where a RACH transmission may be sent on different UL carriers. An exemplary method performed by a base station includes receiving a random access (RA) preamble on a first component carrier (CC) of a plurality of CCs including at least (Continued)

one uplink (UL) CC and at least one supplemental uplink (SUL) CC and transmitting a response to the RA preamble, wherein the response indicates the first CC.

12 Claims, 11 Drawing Sheets

Related U.S. Application Data

(60) Provisional application No. 62/579,096, filed on Oct. 30, 2017.

(51) Int. Cl.
| | | |
|---|---|---|
| *H04W 72/04* | (2009.01) | |
| *H04W 74/00* | (2009.01) | |
| *H04W 76/11* | (2018.01) | |
| *H04W 80/08* | (2009.01) | |
| *H04L 5/00* | (2006.01) | |
| *H04W 72/0453* | (2023.01) | |

(52) U.S. Cl.
CPC ....... *H04L 5/0094* (2013.01); *H04W 72/0453* (2013.01); *H04W 74/008* (2013.01); *H04W 74/0833* (2013.01); *H04W 76/11* (2018.02); *H04W 80/08* (2013.01)

(56) References Cited

U.S. PATENT DOCUMENTS

| | | | |
|---|---|---|---|
| 2011/0317777 A1 | 12/2011 | Huang et al. | |
| 2013/0250881 A1* | 9/2013 | Liao | H04L 5/0035 370/329 |
| 2017/0013643 A1* | 1/2017 | Nan | H04W 74/0833 |
| 2017/0094688 A1* | 3/2017 | Lee | H04W 48/12 |
| 2017/0311344 A1 | 10/2017 | Lee et al. | |
| 2017/0332413 A1* | 11/2017 | Pelletier | H04W 74/004 |
| 2017/0353976 A1 | 12/2017 | Yerramalli et al. | |
| 2018/0020487 A1* | 1/2018 | Tsai | H04W 74/004 |
| 2018/0192401 A1 | 7/2018 | Au et al. | |
| 2019/0132764 A1 | 5/2019 | Nam et al. | |

FOREIGN PATENT DOCUMENTS

| | | |
|---|---|---|
| GB | 201709678 | 8/2017 |
| GB | 2563453 A | 12/2018 |
| JP | 2011502437 A | 1/2011 |
| JP | 2012525083 A | 10/2012 |
| KR | 20140031228 A | 3/2014 |
| WO | WO-2016072901 A1 | 5/2016 |
| WO | WO-2019098905 A1 | 5/2019 |

OTHER PUBLICATIONS

International Search Report and Written Opinion—PCT/US2018/057240—ISA/EPO—dated Jan. 25, 2019.
NEC: "RACH Procedure Towards SUL Carrier," 3GPP Draft; R1-1717154 PRACH for SUL V1D, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340344, 2 pages, Retrieved from the Internet: URL: http://www.3gpp.org/ftp/Meetings_3GPP_SYNC/RAN1/Docs/ [retrieved on Oct. 8, 2017].
NEC: "Views on UL Sharing of NR and LTE," 3GPP Draft; R1-1716232 NR-LTE Coexistence V3B, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339689, 14 pages, Retrieved from the Internet: URL: http://www.3gpp.org/ftp/Meetings_3GPP_SYNC/RAN1/Docs/ [retrieved on Sep. 17, 2017].
CMCC: "Considerations on Support of Supplementary Uplink Frequency", 3GPP TSG-RAN WG2 Meeting #99bis, R2-1711824, Prague, Czech, Oct. 9-13, 2017,Oct. 13, 2017 (Oct. 13, 2017) The Whole Document, 6 Pages.
Mediatek Inc: "RAR Design Supporting Multiple Preamble Transmission", 3GPP TSG-RAN WG2 Meeting #99, R2-1708049, Berlin, Germany, Aug. 21-25, 2017, 6 Pages.

* cited by examiner

DISAMBIGUATION OF RANDOM ACCESS RESPONSE FOR RANDOM ACCESS SUPPORT ON SUPPLEMENTAL UPLINK

CROSS-REFERENCE TO RELATED APPLICATIONS

This application is a continuation of U.S. application Ser. No. 16/168,282, filed Oct. 23, 2018, which claims benefit of and priority to U.S. Provisional Application No. 62/579,096, filed Oct. 30, 2017, both of which are assigned to the assignee hereof and hereby expressly incorporated by reference herein in their entireties as if fully set forth below and for all applicable purposes.

FIELD

The present disclosure relates generally to wireless communication systems, and more particularly, to random access procedures.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes receiving a random access (RA) preamble on a first component carrier (CC) of a plurality of CCs including at least one uplink (UL) CC and at least one supplemental uplink (SUL) CC and transmitting a response to the RA preamble, wherein the response indicates the first CC.

Certain aspects provide a method for wireless communication by a user equipment (UE). The method generally includes transmitting a random access (RA) preamble on a first component carrier (CC) of a plurality of CCs including at least one uplink (UL) CC and at least one supplemental uplink (SUL) CC and receiving a response to the RA preamble, wherein the response indicates the first CC.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
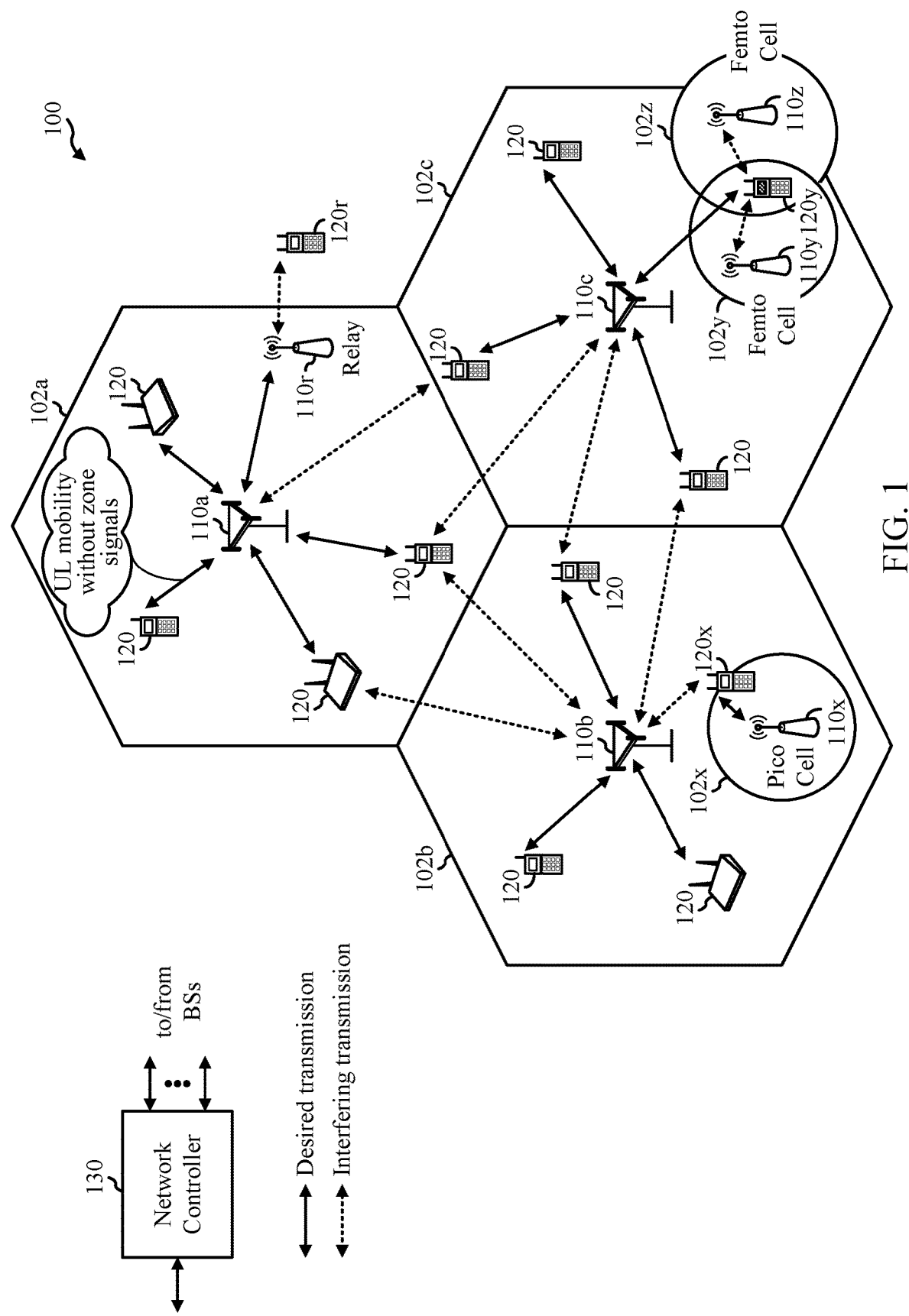
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) services targeting wide bandwidth (e.g., 80 MHz and wider) communications, millimeter wave (mmW) services targeting high carrier frequency (e.g., 27 GHz and higher) communications, massive machine-type communications (mMTC) services targeting non-backward compatible machine-type communications (MTC) techniques, and/or mission critical services targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5 GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and evolved NB (eNB), NB, 5G NB, Next Generation NB (gNB), access point (AP), BS, NR BS, 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, subbands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
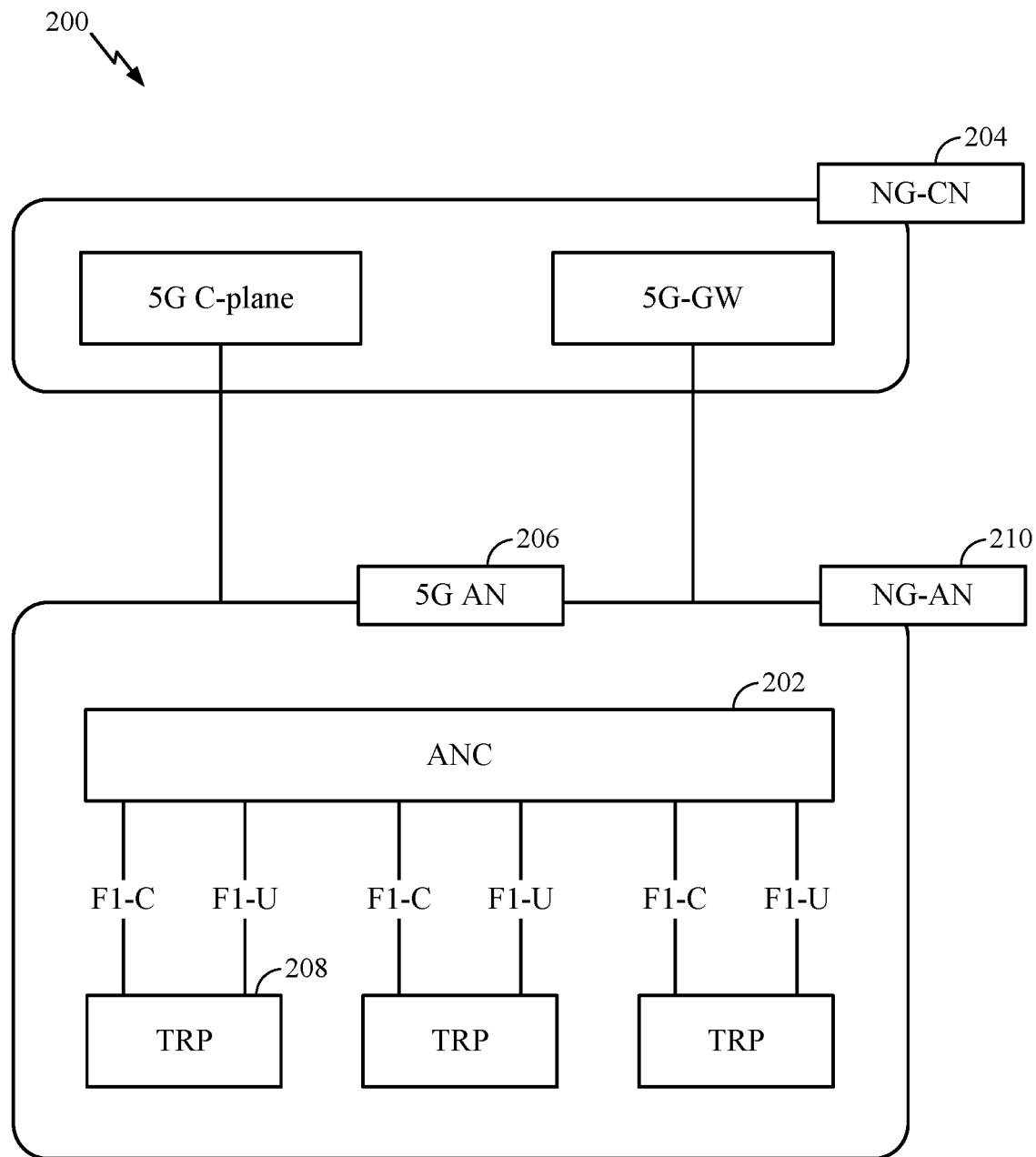
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208. As described above, a TRP may be used interchangeably with "cell".

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may not be present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
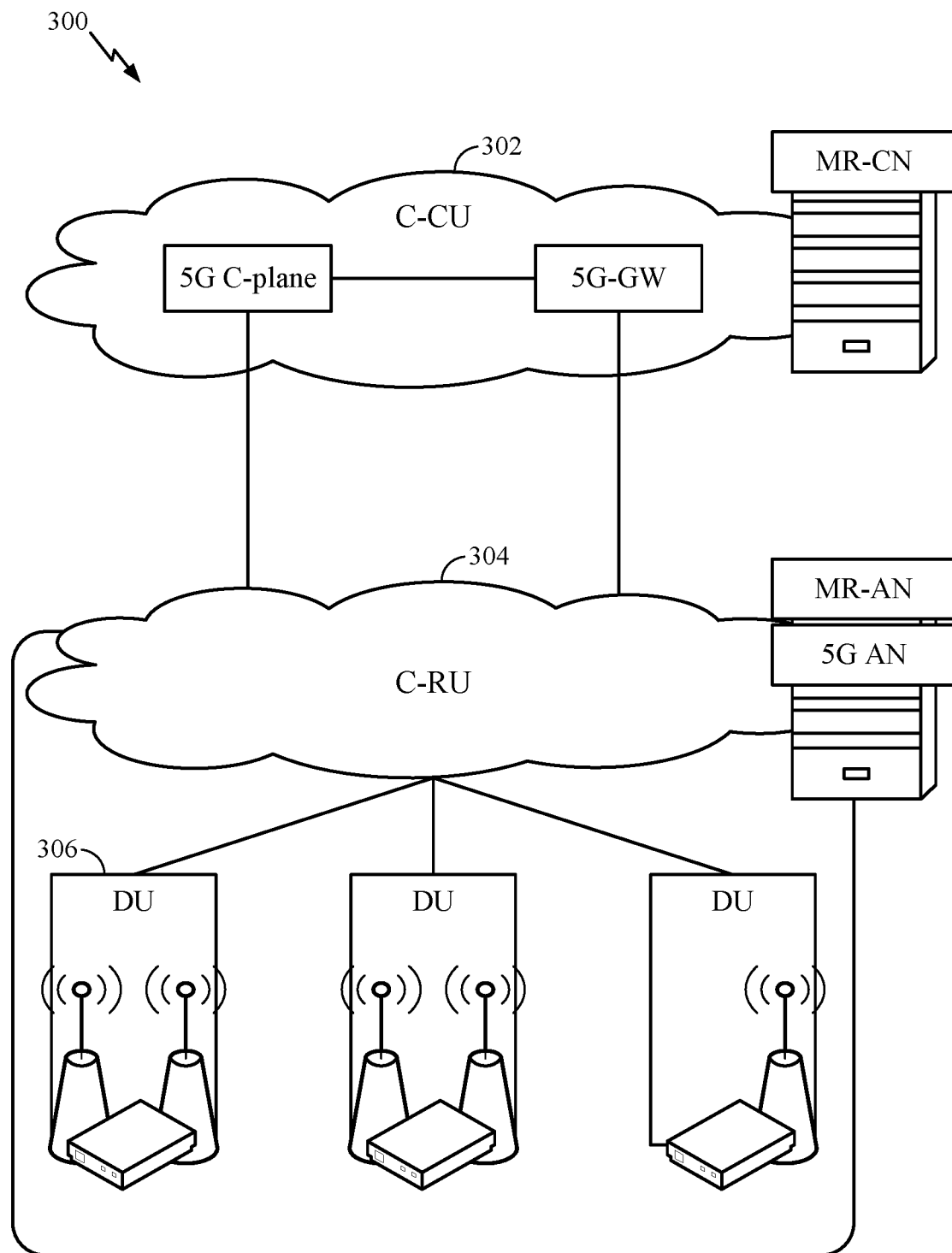
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity. A centralized RAN unit (C-RU) 304 may host one or more ANC functions. The C-RU 304 may host core network functions locally. The C-RU 304 may have distributed deployment. The C-RU 304 may be close to the network edge. A DU 306 may host one or more TRPs. The DU 306 may be located at edges of the network with radio frequency (RF) functionality.

Figure 4:
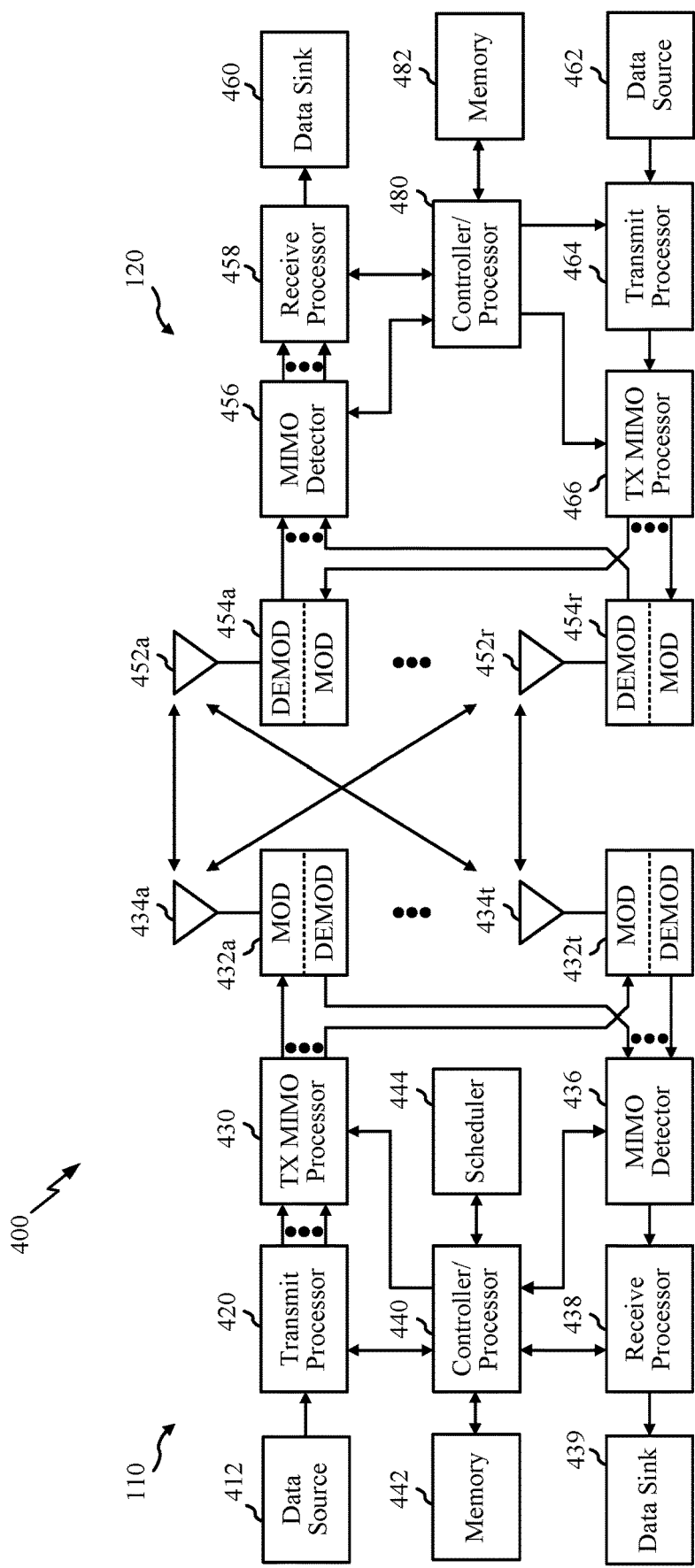
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 14, and 15.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 10, 11, 13, and 14 and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
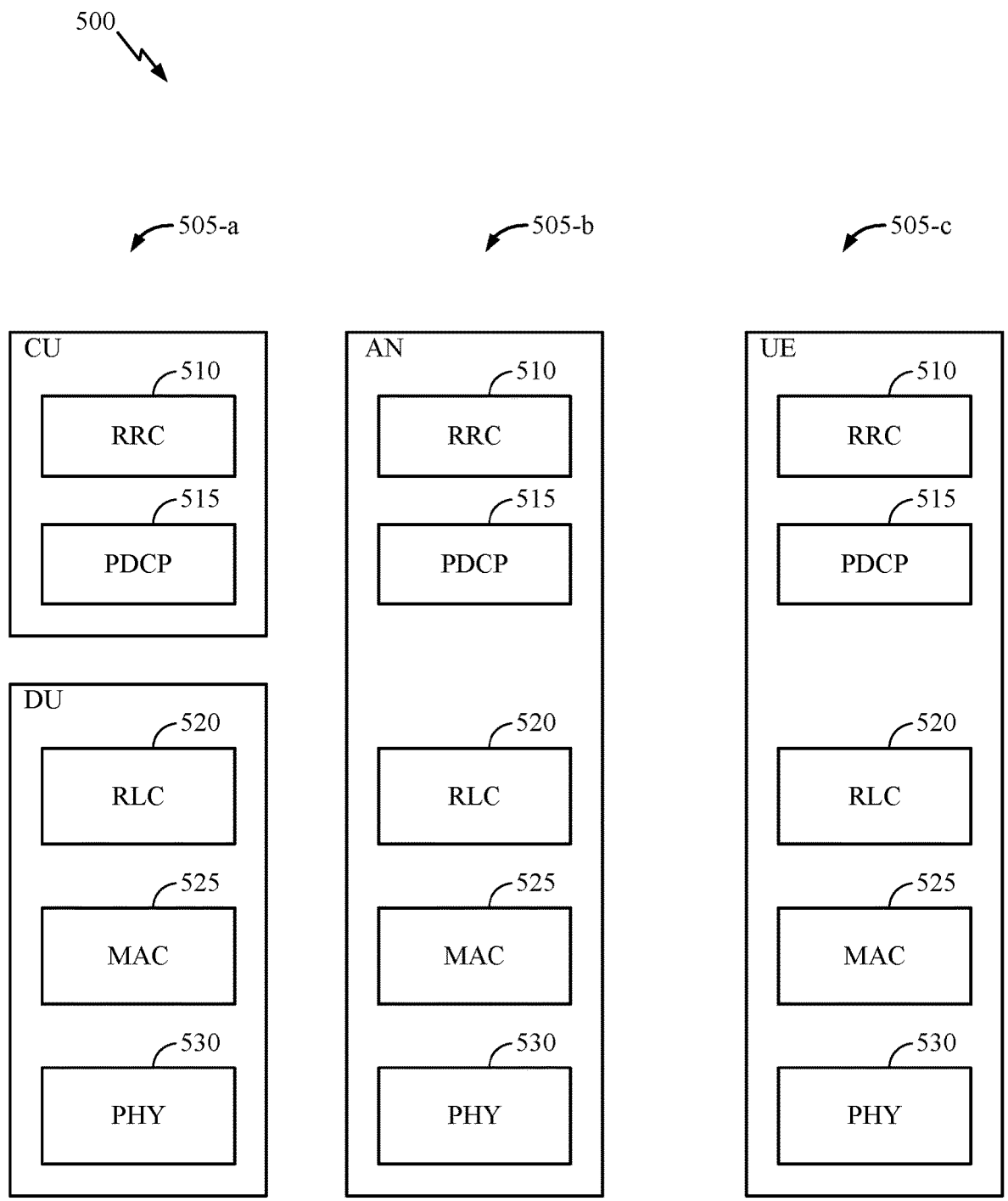
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Figure 6:
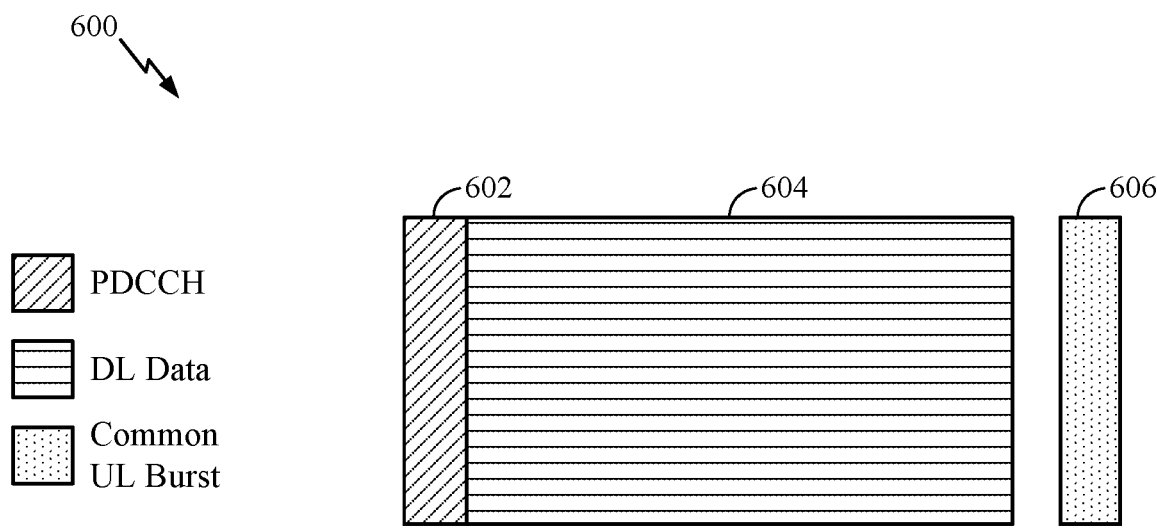
FIG. 6 illustrates an example of a downlink-centric subframe, in accordance with certain aspects of the present disclosure.

FIG. 6 is a diagram showing an example of a DL-centric subframe 600 (e.g., also referred to as a slot). The DL-centric subframe 600 may include a control portion 602. The control portion 602 may exist in the initial or beginning portion of the DL-centric subframe. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
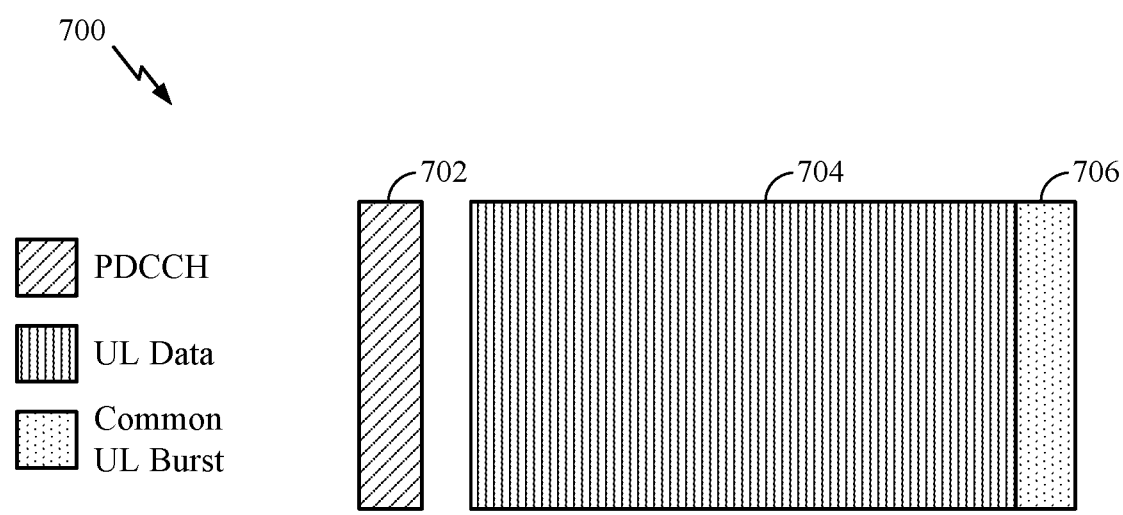
FIG. 7 illustrates an example of an uplink-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Disambiguation of Random Access Response on Supplemental Uplink

Certain wireless communication system deployments utilize multiple downlink (DL) component carriers (CCs) as part of a carrier aggregation (CA) scheme. For example, in addition to a primary DL CC, one or more supplemental DL (SDL) CCs may be used to enhance data throughput and/or reliability in a wireless communication system.

Figure 8:
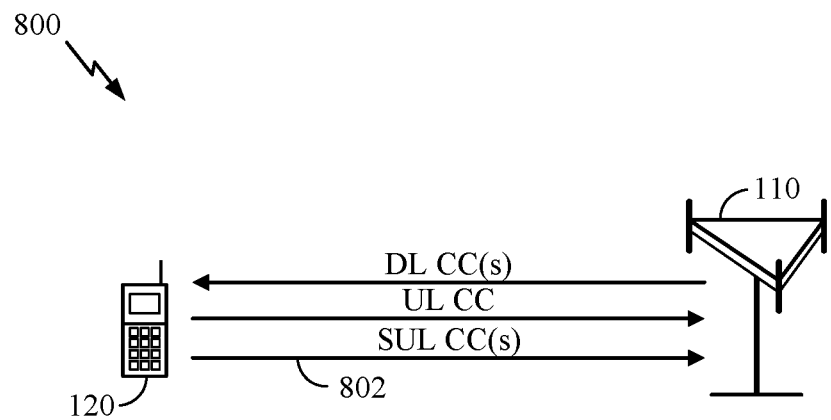
FIG. 8 illustrates an example scenario with supplemental uplink (SUL) component carriers, in which aspects of the present disclosure may be practiced.

As illustrated in FIG. 8, for NR, supplemental uplink (SUL) may also be utilized. Supplemental UL may generally refer to a communications system in which an uplink (UL) CC 802 is utilized without a corresponding DL CC in a cell. As illustrated, an SUL may be utilized for transmissions from a UE 120 to a BS 110. In other words, SUL may generally refer to the case when there are only UL resources for a carrier, from the perspective of an NR device (i.e., UE 120 or BS 110). Aspects of the present disclosure provide techniques that may help support and enable RACH procedures in systems that allow a RACH transmission on either a (primary) UL CC or an SUL CC.

Figure 9:
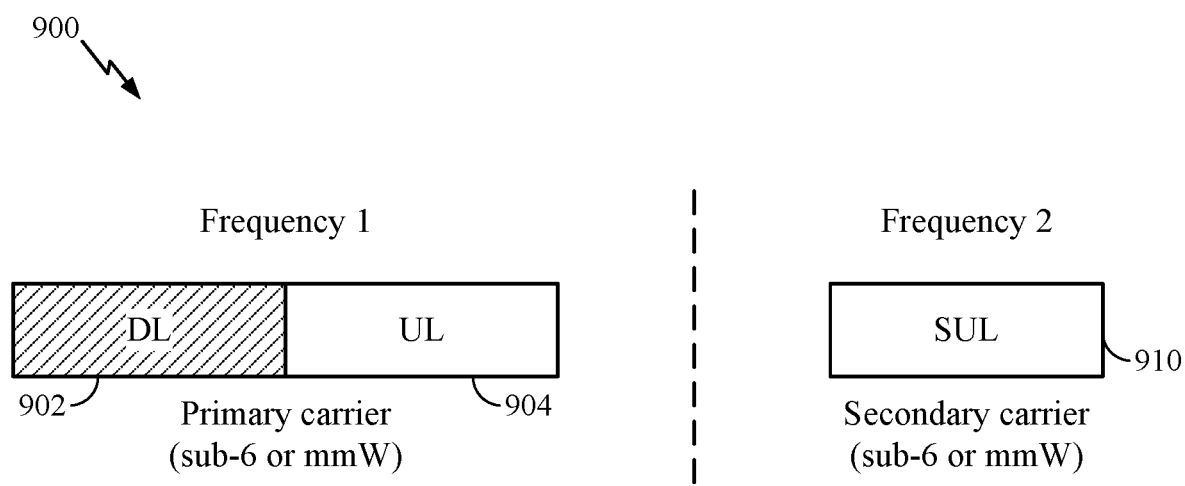
FIG. 9 illustrates example SUL resources, in accordance with certain aspects of the present disclosure.

FIG. 9 illustrates example frequency resources 900 for SUL operation in NR that may be used for a complementary access link with only UL resources (without corresponding DL resources) for a carrier from NR perspective (e.g., sub-6 GHz or mmWave). As illustrated, a UE (e.g., UE 110, shown in FIGS. 1 and 8) in a cell using frequency division duplexing (FDD) may receive DL transmissions on one set of frequency resources 902 and transmit UL transmissions on a corresponding set of frequency resources 904 and on SUL resources 910, which may be on sub-6 GHz or mmWave frequencies.

SUL CCs may be used as a complementary access link for NR TDD and NR FDD scenarios. In other words, a UE may select physical random access channel (PRACH) resources either in the NR TDD or NR FDD uplink frequency or the SUL frequency. The SUL frequency can be a frequency shared with LTE UL communications (e.g., at least for the case when NR spectrum is below 6 GHz). It may be desirable to minimize the impact to NR physical layer design to enable such co-existence. For NR, UE initial access may be based on RACH configuration for an SUL carrier. The RACH configuration for the SUL carrier may be broadcast, for example, in remaining minimum system information (RMSI).

The configuration information for the SUL carrier may be sufficient for UEs to complete RACH procedures via only that SUL carrier (e.g., the configuration information may include all necessary power control parameters). The configuration information for the SUL carrier may also include a threshold. For example, the UE may be configured to select that SUL carrier for initial access if (and maybe only if) the reference signal receive power (RSRP) measured by the UE on the DL carrier where the UE receives RMSI is lower than the threshold.

If the UE starts a RACH procedure (i.e., a PRACH procedure) on the SUL carrier, then the RACH procedure may be completed with all uplink transmissions (e.g., Msg1, Msg3) of the RACH procedure taking place on that carrier. All downlink transmission related to the RACH procedure (e.g., Msg2 and Msg4) may take place on DL frequency resources.

The network may be able to request a connected-mode UE to initiate a RACH procedure on any uplink carrier (e.g., via an SUL CC) for path-loss and timing-advance acquisition.

In LTE, an eNB may generate a random access response (RAR) as a response to the random access (RA) preamble transmitted by a UE. The CRC of the PDCCH scheduling the PDSCH carrying the RAR is scrambled by a random access radio network temporary identifier (RA-RNTI), which unambiguously identifies which time-frequency resource was utilized by the UE to transmit the random access preamble, based on a known relationship:

$$RA\text{-}RNTI = 1 + t_{id} + 10 * f_{id},$$

where $t_{id}$ and $f_{id}$ are the time resource index and the frequency resource index of the corresponding PRACH preamble.

The same RA-RNTI can be used to address multiple UEs when the multiple UEs use the same PRACH time and frequency resources, but different RA preambles. In this case, the MAC PDU (of the PDSCH) includes multiple MAC RARs, one for each UE. A MAC RAR for each UE is identified by a Random Access Preamble Identifier (RAPID) of the RA preamble used by the UE in the associated MAC PDU subheader.

Figure 10:
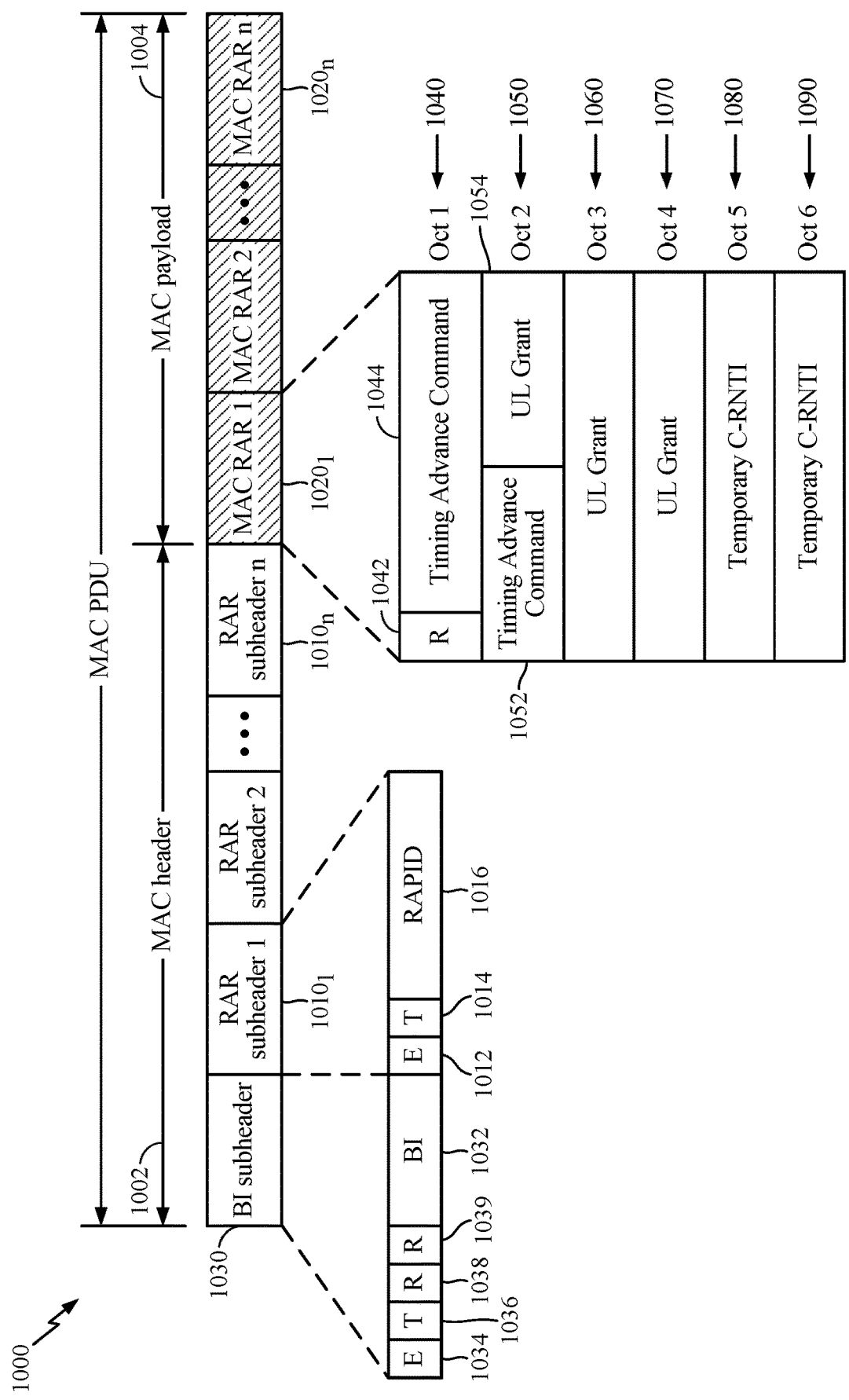
FIG. 10 illustrates an example medium access control (MAC) protocol data unit (PDU) conveying random access responses (RARs), in accordance with certain aspects of the present disclosure.

FIG. 10 illustrates an example MAC PDU 1000 including multiple random access responses (RARs) 1020, in accordance with certain aspects of the present disclosure. The MAC PDU includes a MAC header 1002 and a MAC payload 1004. As illustrated, a RAR subheader 1010k (where k is a member of {1, . . . , n}) in the MAC header is associated with a MAC RAR 1020k in the MAC payload. The MAC header may include a plurality of RAR subheaders and a backoff indicator (BI) subheader 1030. The BI subheader may include an extension (E) field 1034, a type (T) field 1036, two reserved (R) fields 1038 and 1039, and a BI field 1032 of four bits, for example. The BI field indicates an overload condition in the cell and re-sets backoff time for contention resolution when received by a UE performing a contention-based RA procedure. As illustrated, each RAR subheader may include these fields:

E (1-bit): extension field 1012;
T (1-bit): type field 1014; and
RAPID 1016 (6 bits).

The example RARs each include six octets (i.e., 48 bits) 1040, 1050, 1060, 1070, 1080, and 1090. The example RAR may include a reserved (R) bit field 1042 in the first octet 1040. The remaining bits 1044 in the first octet and the first four bits 1052 of the second octet may be a timing advance command included in the example RAR. The remaining bits 1054 in the second octet and the bits of the third octet 1060 and fourth octet 1070 may convey the UL grant of the RAR. The bits of the fifth octet 1080 and the sixth octet 1090 may convey a temporary cell radio network temporary identifier (C-RNTI) assigned by the cell to the UE to which the RAR is directed.

In NR, the RA preamble can be transmitted either on an UL CC or on an SUL CC, but the RAR is always transmitted on the same DL CC. According to aspects described herein, to avoid ambiguity in RAR, PRACH resources may be identified by a frequency index, a time index, RAPID (same as LTE), and an UL carrier (UL or SUL) index.

Some aspects provide for disambiguation for a backoff indicator (BI). In many deployments, the load conditions on UL and SUL can be different, for example, one of them can be overloaded while the other is lightly loaded. Therefore, when a BI subheader is present in the MAC header of a RAR MAC PDU, it may be beneficial to designate the carrier (UL or SUL) for which the backoff indicator is effective. In some cases, this can be done by adding a carrier indicator field in a BI subheader. A reserved field in the current BI subheader can be used for the carrier indicator field in a BI subheader constructed according to the present disclosure.

Figure 11:
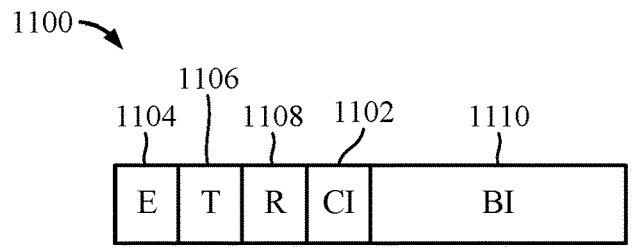
FIG. 11 illustrates an example backoff indicator (BI) subheader with carrier indication, in accordance with certain aspects of the present disclosure.

FIG. 11 illustrates an example BI subheader 1100 with a carrier indication, according to aspects of the present disclosure. The example BI subheader may include a 1-bit carrier indicator (CI) field 1102. The example BI subheader also has an extension (E) field 1104, a type (T) field 1106, a reserved field 1108, and a backoff indicator (BI) field 1110, which are similar to the fields in the LTE BI subheader described above with reference to FIG. 10.

In some cases, carrier indication may be provided with a RAR. According to a first option, the carrier indication may be provided by RA-RNTI. For example, different and disjoint sets of RA-RNTI can be used to indicate an UL CC and an SUL CC, such as:

$$RA\text{-}RNTI_{UL} = 1 + t_{id} + N_F \times f_{id}, \text{ where}$$

$N_F$ is a constant related to (e.g., equal to) the maximum number of time-domain RACH resources within a frequency allocation, $t_{id}$ is a time resource identifier identifying a slot and symbol for the corresponding PRACH for the UL CC, and $f_{id}$ is a frequency resource identifier for the corresponding PRACH for the UL CC; and $$RA\text{-}RNTI_{SUL} = 1 + t_{id} + N_F \times f_{id} + \Delta_{SUL}, \text{ where}$$

$N_F$ is the constant, $t_{id}$ is a time resource identifier identifying a slot and symbol for the corresponding PRACH for the SUL CC, $f_{id}$ is a frequency resource identifier for the corresponding PRACH for the SUL CC, and $\Delta_{SUL}$ is another constant that may be different from $N_F$. $N_F$ may be large enough that changes to $f_{id}$ cause changes to RA-RNTI that are outside of (e.g., larger than) a range of changes to RA-RNTI that can be caused by changes in $t_{id}$. Similarly $\Delta_{SUL}$ may be large enough that the ranges of RA-RNTI$_{UL}$ and of RA-RNTI$_{SUL}$ do not overlap. For example, $t_{id}$ may be calculated as the sum of a symbol identifier ($s_{id}$, where $0 \leq s_{id} < 14$) plus a constant (e.g., 14) times a slot identifier (slot$_{id}$, where $0 \leq$ slot$_{id} < 80$), $N_F$ may be 1120, $f_{id}$ may be in the range [0-8] (i.e., $0 \leq f_{id} < 8$), and $\Delta_{SUL}$ may be set equal to 8960×a carrier identifier (e.g., $0 \leq$ carrier$_{id} \leq 1$). During a RAR window, a UE which transmitted an RA preamble on the UL CC monitors PDCCH with RA-RNTI$_{UL}$, while a UE which transmitted an RA preamble on the SUL CC monitors PDCCH with RA-RNTI$_{SUL}$.

According to a second option, carrier indication may be provided by MAC PDU subheaders. For example, a MAC PDU subheader associated with a MAC RAR may contain carrier identifier field, as well as a RAPID (Random Access Preamble ID), as illustrated in FIG. 12, described below.

Figure 12:
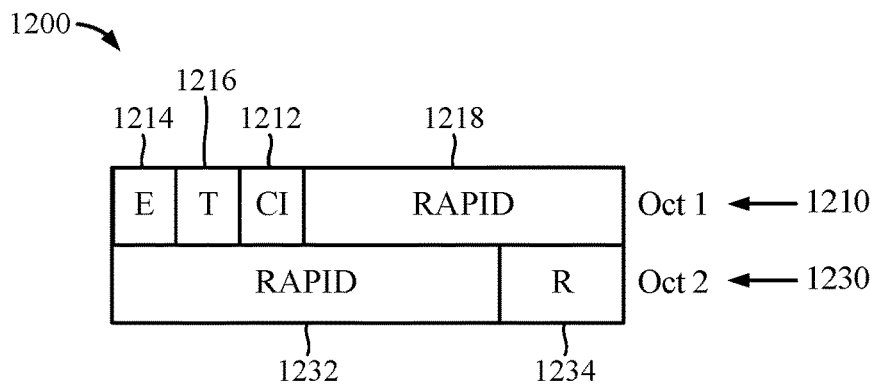
FIG. 12 illustrates an example medium access control (MAC) subheader with carrier indication, in accordance with certain aspects of the present disclosure.

FIG. 12 illustrates an example NR MAC subheader 1200, according to aspects of the present disclosure. The example NR MAC subheader includes two octets 1210 and 1230 (i.e., 16 bits), and may include a 1-bit carrier indicator (CI) field 1212, an extension (E) field 1214, a type (T) field 1216, and two fields 1218 and 1232 for RAPID. The example NR MAC subheader may also have reserved (R) bits 1234.

According to a third option, carrier indication may be provided by a MAC RAR. For example, a MAC RAR may contain a 20-bit UL grant for Msg3 transmission (of an RA procedure) on PUSCH. The UL grant in the MAC RAR can contain a carrier indicator field to indicate whether the PUSCH is transmitted on an UL CC or an SUL CC. Since Msg3 transmission takes place on the same carrier as Msg1, the CI in the UL grant can disambiguate the RAR, in that CI in the grant both indicates the carrier for the Msg3 transmission and the carrier on which the Msg1 transmission (i.e., the RA preamble transmission) occurred.

Figure 13:
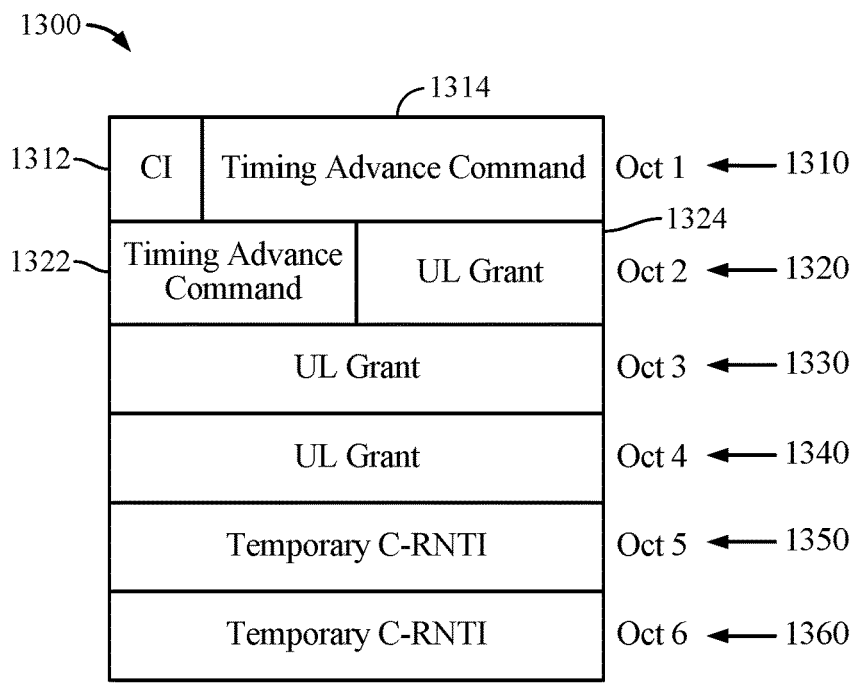
FIG. 13 illustrates an example random access response (RAR), in accordance with certain aspects of the present disclosure.

FIG. 13 illustrates an example RAR 1300 with a CI, in accordance with certain aspects of the present disclosure. The example RAR includes six octets (i.e., 48 bits), similar to the RARs 1020 illustrated in FIG. 10. The example RAR may include a CI field 1312 in the first octet 1310. It should be noted that the first bit of the first octet is a reserved bit 1042 in the first octet 1040 of the RARs illustrated in FIG. 10. The remaining bits 1314 in the first octet and the first four bits 1322 of the second octet may be a timing advance command included in the example RAR. The remaining bits 1324 in the second octet and the bits of the third octet 1330 and fourth octet 1340 may convey the UL grant of the RAR. The bits of the fifth octet 1350 and the sixth octet 1360 may convey a temporary cell radio network temporary identifier (C-RNTI) assigned by the cell to the UE to which the RAR is directed.

According to aspects of the present disclosure, if more than one SUL CC is supported in a cell, then the number of RA-RNTI sets (i.e., as described above) and/or the size of a carrier indicator field (i.e., as described above with reference to FIGS. 11-13) may increase accordingly. DL transmission resources and/or UL transmission resources may be composed of multiple component carriers in a CA scenario, but only the primary component carrier (PCC) contains PRACH resources.

Figure 14:
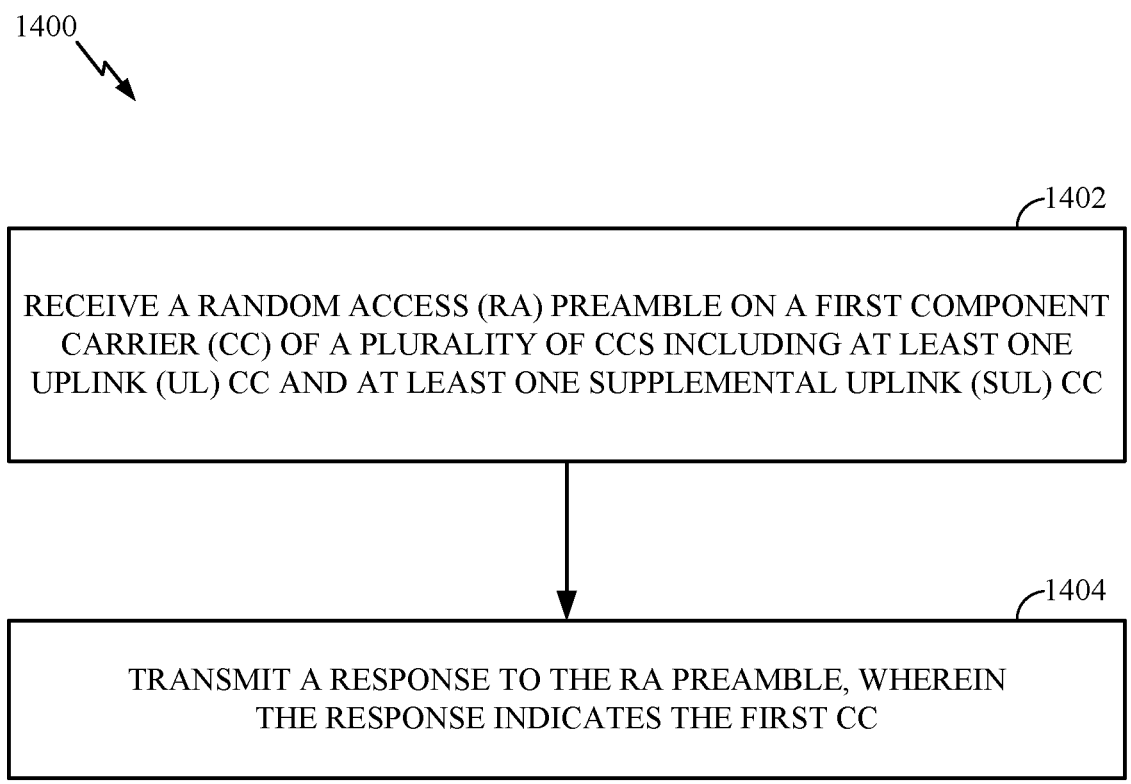
FIG. 14 illustrates example operations for wireless communications by a base station (BS), in accordance with aspects of the present disclosure.

FIG. 14 illustrates example operations for wireless communications by a base station (BS), such as BS 110, shown in FIGS. 1 and 4, in accordance with aspects of the present disclosure.

Operations 1400 begin, at block 1402, with the BS receiving a random access (RA) preamble on a first component carrier (CC) of a plurality of CCs including at least one uplink (UL) CC and at least one supplemental uplink (SUL) CC. For example, BS 110 receives a random access (RA) preamble (e.g., from UE 120) on an SUL CC of a plurality of CCs including at least one UL CC and the SUL CC.

At block 1404, operations 1400 continue with the BS transmitting a response to the RA preamble, wherein the response indicates the first CC. Continuing the example, BS 110 transmits a RAR in response to the RA preamble, wherein the RAR indicates the SUL CC in a CI field of the RAR, as described above with reference to FIG. 13.

Figure 15:
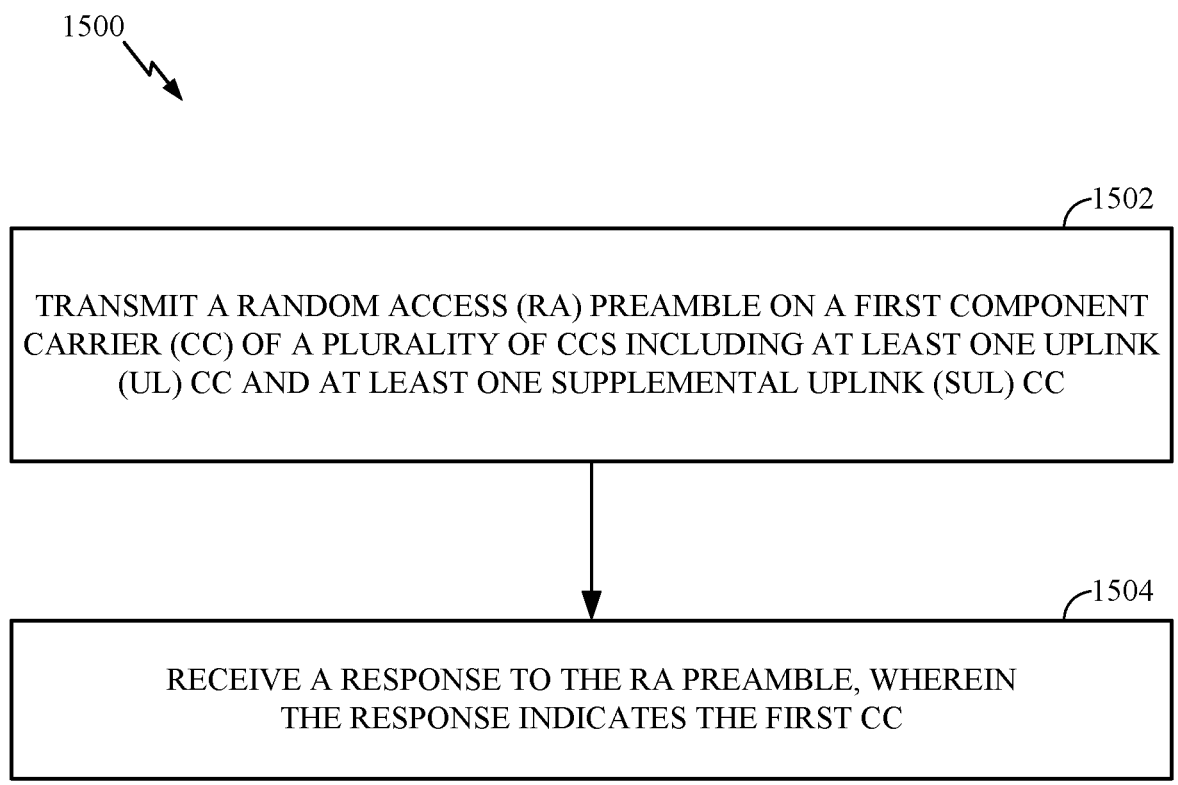
FIG. 15 illustrates example operations for wireless communications by a user equipment (UE), in accordance with aspects of the present disclosure.

FIG. 15 illustrates example operations for wireless communications by a user equipment (UE), such as UE 120 shown in FIGS. 1 and 4, in accordance with aspects of the present disclosure.

Operations 1500 begin, at block 1502, with the UE transmitting a random access (RA) preamble on a first component carrier (CC) of a plurality of CCs including at least one uplink (UL) CC and at least one supplemental uplink (SUL) CC. For example, UE 120 transmits a random access (RA) preamble on an SUL CC of a plurality of CCs including at least one UL CC and the SUL CC.

At block 1504, operations 1500 continue with the UE receiving a response to the RA preamble, wherein the response indicates the first CC. Continuing the example, UE 120 receives a response (e.g., from BS 110) to the RA preamble in a RAR, wherein the RAR indicates the SUL CC in a CI field of the RAR, as described above with reference to FIG. 13.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 14 and 15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a base station (BS), comprising:
receiving a random access (RA) preamble on a first component carrier (CC) of a plurality of CCs including at least one uplink (UL) CC and at least one supplemental uplink (SUL) CC;
transmitting a response to the RA preamble, wherein the response indicates the first CC and comprises a physical downlink control channel (PDCCH) scrambled by a random access radio network temporary identifier (RA-RNTI) that indicates the first CC; and
calculating the RA-RNTI based on a time resource identifier and a frequency resource identifier for the RA preamble for the first CC and by selectively using a $\Delta_{SUL}$ value based on whether the first CC is the SUL CC.

2. The method of claim 1, wherein:
calculating the RA-RNTI when the first CC is not the SUL CC comprises calculating:

RA-RNTI=$1+t_{id}+N_F \times f_{id}$, wherein:

$t_{id}$ is the time resource identifier for the RA preamble for the first CC;
$N_F$ is a constant; and
$f_{id}$ is the frequency resource identifier for the RA preamble for the first CC; and
calculating the RA-RNTI when the first CC is the SUL CC comprises calculating:

RA-RNTI=$1+t_{id}+N_F \times f_{id}+\Delta_{SUL}$, wherein:

$t_{id}$ is the time resource identifier for the RA preamble for the first CC;
$N_F$ is the constant;
$f_{id}$ is the frequency resource identifier for the RA preamble for the first CC; and
$\Delta_{SUL}$ is the value indicating the SUL CC.

3. The method of claim 2, wherein NF is a constant related to a maximum number of time-domain random access channel (RACH) resources within a frequency allocation made by the BS.

4. A method for wireless communications performed by a user equipment (UE), comprising:
transmitting a random access (RA) preamble on a first component carrier (CC) of a plurality of CCs including at least one uplink (UL) CC and at least one supplemental uplink (SUL) CC;
receiving a response to the RA preamble, wherein the response indicates the first CC and comprises a physical downlink control channel (PDCCH) scrambled by a random access radio network temporary identifier (RA-RNTI) that indicates the first CC; and
calculating the RA-RNTI based on a time resource identifier and a frequency resource identifier for the RA preamble for the first CC and by selectively using a $\Delta_{SUL}$ value based on whether the first CC is the SUL CC.

5. The method of claim 4, wherein:
calculating the RA-RNTI when the first CC is not the SUL CC comprises calculating:

RA-RNTI=$1+t_{id}+N_F \times f_{id}$, wherein:

$t_{id}$ is the time resource identifier for the RA preamble for the first CC;
$N_F$ is a constant; and
$f_{id}$ is the frequency resource identifier for the RA preamble for the first CC; and
calculating the RA-RNTI when the first CC is the SUL CC comprises calculating:

RA-RNTI=$1+t_{id}+N_F \times f_{id}+\Delta_{SUL}$, wherein:

$t_{id}$ is the time resource identifier for the RA preamble for the first CC;
$N_F$ is the constant;
$f_{id}$ is the frequency resource identifier for the RA preamble for the first CC; and
$\Delta_{SUL}$ is the value indicating the SUL CC.

6. The method of claim 5, wherein the response to the RA preamble is received from a base station (BS) and NF is a constant related to a maximum number of time-domain random access channel (RACH) resources within a frequency allocation made by the BS.

7. In a wireless communications system, an apparatus comprising:
a memory; and
a processor coupled to the memory and configured to:
receive a random access (RA) preamble on a first component carrier (CC) of a plurality of CCs including at least one uplink (UL) CC and at least one supplemental uplink (SUL) CC;
transmit a response to the RA preamble, wherein the response indicates the first CC and comprises a physical downlink control channel (PDCCH) scrambled by a random access radio network temporary identifier (RA-RNTI) that indicates the first CC; and
calculate the RA-RNTI based on a time resource identifier and a frequency resource identifier for the RA preamble for the first CC and by selectively using a $\Delta_{SUL}$ value based on whether the first CC is the SUL CC.

8. The apparatus of claim 7, wherein the processor is further configured to:
calculate the RA-RNTI when the first CC is not the SUL CC by calculating:

RA-RNTI=$1+t_{id}+N_F \times f_{id}$, wherein:

$t_{id}$ is the time resource identifier for the RA preamble for the first CC;
$N_F$ is a constant; and
$f_{id}$ is the frequency resource identifier for the RA preamble for the first CC; and calculate the RA-RNTI when the first CC is the SUL CC by calculating:

RA-RNTI=$1+t_{id}+N_F \times f_{id}+\Delta_{SUL}$, wherein:

$t_{id}$ is the time resource identifier for the RA preamble for the first CC;

$N_F$ is the constant;

$f_{id}$ is the frequency resource identifier for the RA preamble for the first CC; and $\Delta_{SUL}$ is the value indicating the SUL CC.

9. The apparatus of claim 8, wherein NF is a constant related to a maximum number of time-domain random access channel (RACH) resources within a frequency allocation made by the apparatus.

10. In a wireless communications system, an apparatus comprising:

a memory; and a processor coupled to the memory and configured to:

transmit a random access (RA) preamble on a first component carrier (CC) of a plurality of CCs including at least one uplink (UL) CC and at least one supplemental uplink (SUL) CC;

receive a response to the RA preamble, wherein the response indicates the first CC and comprises a physical downlink control channel (PDCCH) scrambled by a random access radio network temporary identifier (RA-RNTI) that indicates the first CC; and calculate the RA-RNTI based on a time resource identifier and a frequency resource identifier for the RA preamble for the first CC and by selectively using a $\Delta_{SUL}$ value based on whether the first CC is the SUL CC.

11. The apparatus of claim 10, wherein the processor is further configured to:

calculate the RA-RNTI when the first CC is not the SUL CC by calculating:

RA-RNTI=$1+t_{id}+N_F \times f_{id}$, wherein:

$t_{id}$ is the time resource identifier for the RA preamble for the first CC;

$N_F$ is a constant; and $f_{id}$ is the frequency resource identifier for the RA preamble for the first CC; and calculate the RA-RNTI when the first CC is the SUL CC by calculating:

RA-RNTI=$1+t_{id}+N_F \times f_{id}+\Delta_{SUL}$, wherein:

$t_{id}$ is the time resource identifier for the RA preamble for the first CC;

$N_F$ is the constant;

$f_{id}$ is the frequency resource identifier for the RA preamble for the first CC; and $\Delta_{SUL}$ is the value indicating the SUL CC.

12. The apparatus of claim 11, wherein the response to the RA preamble is received from a base station (BS) and NF is a constant related to a maximum number of time-domain random access channel (RACH) resources within a frequency allocation made by the BS.

* * * * *